United States Patent [19]

Tremblay et al.

[11] Patent Number: 5,340,379
[45] Date of Patent: Aug. 23, 1994

[54] JET FLOW DEVICE FOR INJECTING GAS INTO MOLTEN METAL AND PROCESS

[75] Inventors: Francois Tremblay, St-Fulgence; Ghyslain Dubé, Chicoutimi, both of Canada

[73] Assignee: Alcan International Limited, Montreal, Canada

[21] Appl. No.: 39,099

[22] Filed: Apr. 9, 1993

[30] Foreign Application Priority Data

Nov. 9, 1990 [CA] Canada ................................ 2029680

[51] Int. Cl.$^5$ ............................................. C22B 9/04
[52] U.S. Cl. .................................. 75/680; 75/681; 75/708; 266/208; 266/233
[58] Field of Search ............... 266/216, 233, 208, 218; 75/708, 680, 681

[56] References Cited

U.S. PATENT DOCUMENTS

| | | |
|---|---|---|
| 1,907,481 | 5/1933 | Betterton . |
| 3,599,831 | 8/1971 | Harvill . |
| 4,008,884 | 2/1977 | Fitzpatrick et al. . |
| 4,169,584 | 10/1979 | Mangalick . |
| 4,328,958 | 5/1982 | Dolzhenkov ................ 266/233 |
| 5,020,778 | 6/1991 | Thibault et al. ............. 266/233 |

FOREIGN PATENT DOCUMENTS

| | | |
|---|---|---|
| 0092983 | 4/1983 | European Pat. Off. . |
| 0181227 | 11/1985 | European Pat. Off. . |
| 0348037 | 5/1989 | European Pat. Off. . |
| 2433053 | 3/1980 | France . |
| 2054396 | 7/1980 | United Kingdom . |

*Primary Examiner*—Melvyn J. Andrews

[57] ABSTRACT

A device is described for injecting gas into molten metal, e.g. molten aluminum, in a furnace chamber. It comprises: (a) a stirring apparatus having a reservoir chamber separate from the furnace chamber, a connector portion with an orifice connecting the interior of the furnace and the reservoir for the passage of the molten metal between them through the connector portion, vacuum/pressure generating means connected to the reservoir chamber interior for alternatively and successively producing therein a vacuum for drawing molten metal into its interior from the furnace chamber and a positive pressure for expelling the molten metal therefrom into the furnace chamber through the orifice in the form of a high velocity stirring jet, and (b) gas injector means adapted to inject gas into the high velocity stirring jet such that the gas is broken down into a large number of small bubbles which are circulated throughout the furnace chamber with the stirring jet.

17 Claims, 5 Drawing Sheets

□ CONVENTIONAL FLUXING

◇ JET FLUXING

JET FLOW DEVICE FOR INJECTING GAS INTO MOLTEN METAL AND PROCESS

TECHNICAL FIELD

The invention relates to an apparatus and method for treating molten metal wherein a gas is dispersed in the melt.

BACKGROUND ART

It is well known that considerable difficulties may arise in the production of castings from metals, such as aluminum and its alloys, magnesium and its alloys, etc., due to the incidents of defects associated with dissolved and dispersed impurities. The main dissolved impurities are hydrogen and alkali or alkaline earth metals, e.g. lithium, sodium, calcium, etc., while the dispersed impurities are typically solid inclusions, such as oxides, carbides, borides, nitrides, etc.

The injection of an inert gas or inert-reactive gas mixture into molten metal is a commonly used technique for the removal of above contaminants. Such systems are described in Szekel, U.S. Pat. No. 3,743,263, Withers et al, U.S. Pat. No. 4,634,105, etc. These prior systems are based upon injecting gas in the form of small discrete bubbles throughout the melt. Hydrogen is removed from the melt by desorption into the gas bubbles, while the solid inclusions are lifted into the dross layer by flotation.

In order to maximize the metallurgical efficiency of any gas/liquid injection process, it is essential to obtain good coupling between the liquid phase and the gaseous phase. In particular, the generation of large interfacial area between the gas and the liquid is absolutely necessary and to maximize mass transfer and improve the kinetics of the reaction. In the case of high surface tension liquid metals, such as liquid aluminum, the energy required to generate this large interfacial area is best provided by generating high shear forces, e.g. by means of rotary gas injectors such as that described in U.S. Pat. No. 4,634,105.

However, the generation of a large gas/liquid interfacial area is not the only important process requirement to maximize overall process efficiency. Good bulk liquid mixing or circulation is also essential. For instance, it has been clearly demonstrated that when gas is injected into a molten metal bath through stationary lances, the lack of effective metal circulation is one of the main factors limiting the efficiency of impurities removal. This is because large bubbles plumes are relatively ineffective in promoting bulk metal circulation. Gas momentum is negligible and circulation is driven exclusively by liquid entrainment into the rising bubble plume.

The melting furnaces used in the aluminum industry are typically in the form of very large shallow baths. Thus, such baths typically have liquid metal depths of no more than about 1.5 meters, but may have very large horizontal areas since furnaces having capacities in the range of 30-150 tons are now commonplace. It will be evident that stationary lances are most inefficient for these large shallow baths, since the residence time of the gas in the melt is very short and the power that can be introduced for stirring via the buoyant energy of the gas bubbles is extremely limited.

Another major factor in the treatment of molten metal with gases is the rate of surface turbulence. It is well established that surface turbulence must be minimized in order to avoid large quantities of dross being formed, as well as to minimize oxide inclusion formation and hydrogen absorption through the surface of the bath. Furthermore, when chlorine is used as a reactive gas, serious environmental problems are created when large quantities of chlorine are not reacted with the metal bath and are released from the surface of the melt.

Rotary gas injectors, such as that described in U.S. Pat. No. 4,634,105, work very well in small furnaces of less than about 30 tonnes capacity, but they present major practical problems when used in association with large furnaces. Thus, a large number of rotors must be mounted across the furnace and the moving parts and drive mechanisms associated with such rotors are most incompatible with the environment of metal melting furnaces. The initial costs of such systems are high and there are also very high maintenance costs.

Another system that works quite well for mixing gases with molten metals is an in-line fully mixed reactor, designed with one or several rotors/baffles combinations to subdivide the treatment gas into small individual bubbles and create strong mixing currents within the liquid bath. While such a system in highly effective for treating molten metal being moved through a conduit, it is not a practical answer for the treatment of large, shallow, static molten metal baths found in melting furnaces.

Yet another system for the treatment of molten metal with gases is a combination of a mechanical centrifugal circulating pump and a static gas injection lance located inside the enclosed outlet section of the pump. Such system is described in U.S. Pat. No. 4,169,584. However, it has the disadvantage of requiring a circulating system external of a large molten metal bath and it also has the high initial cost and maintenance problems associated with a mechanical rotary system for circulating molten metal.

It is also known to inject a reactive gas mixture into liquid metals using porous plugs mounted in the base or refractory wall of a furnace. Although such porous refractory elements give satisfactory results when used with liquid of low surface tension, their efficiency for the generation of small gas bubbles is rather poor when in contact with liquid metals of high surface tension, liquid aluminum or steel. Also, partly due to the high back pressure necessary by the fine porosity of these elements (in order to avoid liquid metal penetration into the refractory pores) it is very difficult to provide gas tight connections and interfaces between the porous element and the remainder of the refractory in the furnace. This results in gas diffusion between the steel structure and the refractory lining, causing internal gas leaks. These gas leaks can be extremely dangerous when reactive gas fluxing with chlorine or other reactive compounds is used. Moreover, the fixed porous refractory element does not address the problem of poor bulk liquid mixing and excessive surface turbulence.

U.K. Patent Application 2,054,396, published Feb. 18, 1981, describes a technique where the fluxing gas is sucked in through a pipe or several pipes by a reduced metal pressure produced by means of a standard venturi design. This technique requires a very small gas injection opening in the order of a few millimeters which is not practical for industrial application. The venturi system also requires a molten metal pump.

It is the object of the present invention to provide an improved gas injection system for molten metal which can, without moving parts, efficiently disperse small gas bubbles through a large molten metal bath.

DISCLOSURE OF THE INVENTION

According to the present invention, a high velocity jet of molten metal is created by an orifice located under the melt surface of a molten metal bath. The metal jet ejecting from the orifice travels through the bath below the metal surface causing vigorous mixing of the bath. In accordance with the novel feature, treatment gas is injected into the metal jet in such a manner that the gas is sheared into a large number of small bubbles and these many bubbles are then carried through the metal bath.

The metal jet can conveniently be obtained utilizing a jet stirrer of the type described in European Patent Application 348037, published Dec. 27, 1989. That jet stirrer is particularly adapted for stirring the liquid metal contents of shallow furnaces. The apparatus consists of a reservoir separate from the furnace into which a vacuum draws metal from the furnace through a connector with an orifice, the metal then being returned by gas pressure forcibly into the furnace through the orifice in the form of a horizontally directed jet. The cycle is repeated at sufficiently close intervals to ensure that the furnace bath is quickly and effectively mixed. The reservoir comprises a bottom static part including the connector with orifice and a readily removable top cover carrying heaters for heating the reservoir interior and the dross that deposits on the side walls to ease its removal.

This device produces a very high power jet of liquid aluminum (2.7 kw) and the suction and discharge cycles are typically each approximately 10–15 seconds. A typical orifice has a diameter of about 5–10 cm and the reservoir typically has a capacity in the order of about 500–1000 kg.

The jet emerging from an orifice develops in essentially three zones. The first zone, which is immediately after the orifice outlet, is characterized by a broadening angle of about 5° and the maximum speed obtained in the orifice is concentrated in the centre of the jet in a conical pattern. In the second zone, which is the transition zone, the speed of the centre of the jet diminishes rapidly with increasing distance from the orifice and the broadening angle of the jet is about 30°. In the third and last zone, the spread angle diminishes and the speed of the centre of the jet decreases less rapidly.

With molten aluminum, the first discharge zone has a length equivalent to approximately five times the diameter of the orifice, while the second zone extends a distance equivalent to about 20 times the orifice diameter. In order to achieve the desired shearing action on the gas to produce the desired large number of small bubbles, it is essential that the gas be injected such that it engages the first discharge zone of maximum velocity. To achieve this, the gas may be injected into the molten metal at the inlet to the orifice or directly into the orifice itself or into the cone of maximum velocity contained within the first discharge zone from the orifice. To provide the desired shearing action, the velocity of the metal emerging from the orifice should be at least 1 m/sec. and preferably 5–10 m/sec. The orifice may vary considerably in diameter, but is typically in the range of about 5–10 cm.

The inert treatment gas is typically argon or nitrogen, with argon being preferred. The reactive component may be chlorine, a gaseous fluoride compound (such as $SF_6$, $SiF_4$) or a mixture of the two.

There are a number of important advantages to the system of the present invention over the prior art. Firstly, a large number of very small bubbles are produced and this results in a very large gas/liquid surface contact. Secondly, the residence time of the gas bubbles in the metal is greatly increased because of the very small size of these gas bubbles and because the metal jet give to these bubbles a horizontal speed component which greatly increases the length of their trajectories within the molten metal bath.

As a consequence, there is a greatly improved utilization of the treatment gas such that the same results can be obtained with half the volume of treatment gas that is normally used. Also for the same results, it has been found that the chlorine consumption can be reduced as much as 62% (from 0.24 kg to 0.09 kg/tonne). Furthermore, the fluxing time can be reduced from 45 to 35 minutes and there is a 40% reduction in dross generation during the fluxing time. This reduction in dross generation represents a considerable saving in aluminum.

BRIEF DESCRIPTION OF THE DRAWINGS

Additional features and a fuller understanding of the invention will be obtained in reading the following detailed description made in connection with the accompanying drawings wherein.

BEST MODE FOR CARRYING OUT THE INVENTION

Figure 1:
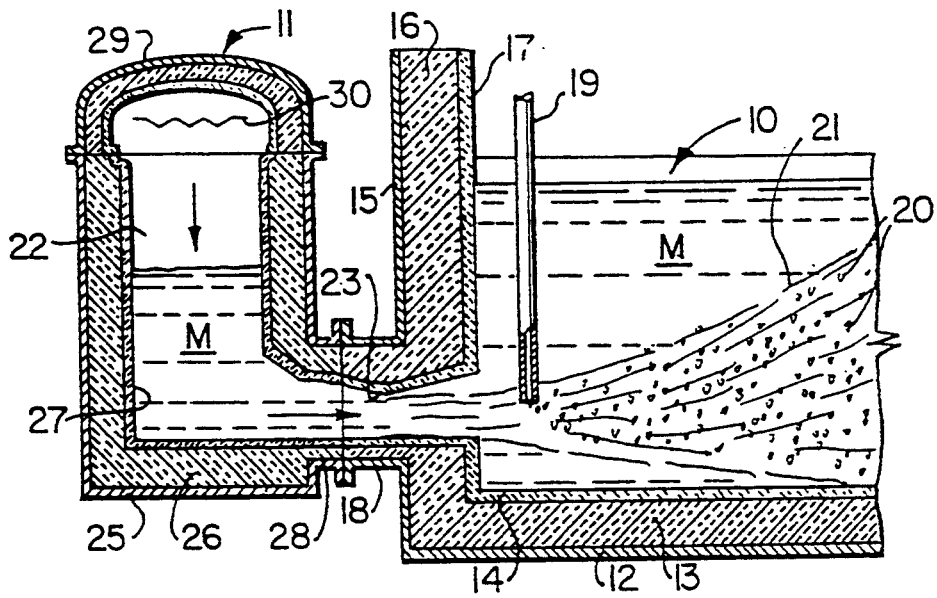
FIG. 1 is a sectional view of a preferred embodiment of the injector system of this invention.

The embodiment as described is intended for use in conjunction with a shallow aluminum melting or casting furnace of rectangular or circular shape indicated generally by reference 10. Connected to the furnace is a jet stirrer 11 of the type described in European Patent Application 348,037.

The furnace has an outer bottom wall 12 and outer side walls 15 formed of sheet steel with thick bottom and side wall insulating portions 13 and 16 respectively. The inner bottom and side walls are coated by refractory layers 14 and 17 respectively, e.g. silicon carbide or alumina.

A side wall 15 of the furnace 10 is provided with a flow connector flange 18 within which is formed an orifice portion 23. This flange 18 connects to a corresponding flange 28 of the jet stirrer 11.

The jet stirrer 11 has a reservoir 22 having outer walls 25 formed of sheet steel, an insulating layer 26 and an inner layer 27 of refractory material. It also includes an insulated removable cover 29 and upper heating elements 30. Flow connectors (not shown) are included in an upper portion of the reservoir 22 for pumping air in or withdrawing air from the reservoir. Finally, the system is provided with a gas injection tube or lance 19 formed of refractory material or graphite for injecting gas into the jet.

This gas injection tube 19 has an outlet which is positioned in the metal jet downstream from the orifice 23 at a horizontal distance of less than five times the diameter of the orifice. It is also essential that the tip or outlet of the gas injection tube or lance 19 be maintained in the proper vertical position relative to the horizontal axis of the metal jet. Thus, it must be maintained within the axial core region of maximum velocity. Since there is damage and wear to the tip of a gas injection tube, it is preferable to include automatic positioning means for the injection tube which automatically compensates for any tip wear or breakage. This can conveniently be done by means of an optical scanning device which measures the actual position of the injection tube before the tube is lowered into the molten metal. The injection tube length can then be adjusted by adjusting the downward movement of a tube positioned to ensure that the gas is released into the zone of maximum velocity.

In operation, suction is first applied to the reservoir 22 thereby drawing metal M from furnace 10 into reservoir 22 and substantially filling the reservoir. This requires approximately 10–15 seconds, at which time the suction is terminated and air pressure is applied to the metal in reservoir 22 forcing it in a downward direction as shown in FIG. 1 and creating through the orifice 23, a jet 21 of the configuration shown. At the same time, gas is fed in through tube 19 where it is sheared off into small bubbles by the very rapidly moving jet 21.

Figure 2:
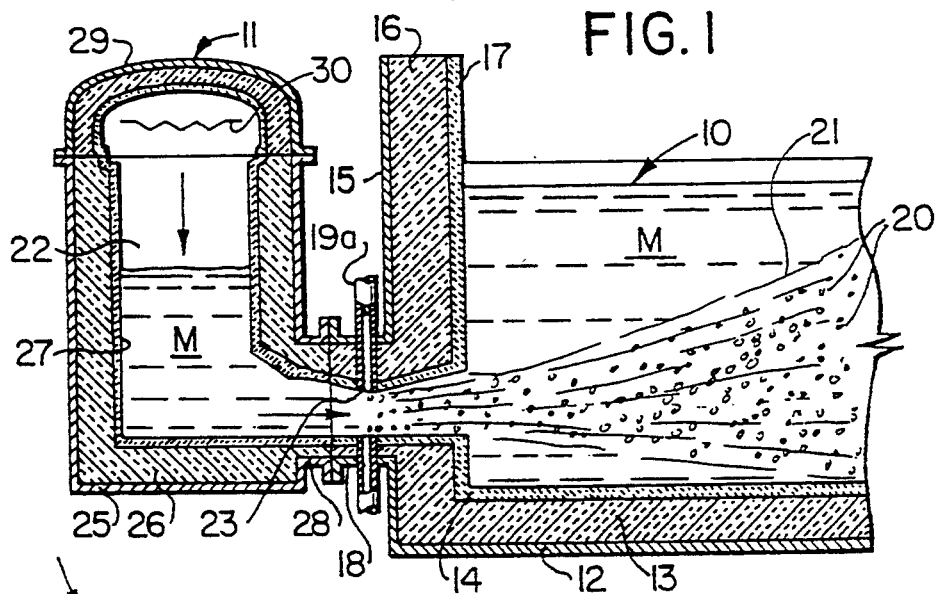
FIG. 2 is a sectional view of an alternative embodiment of the injector system.
Figure 3:
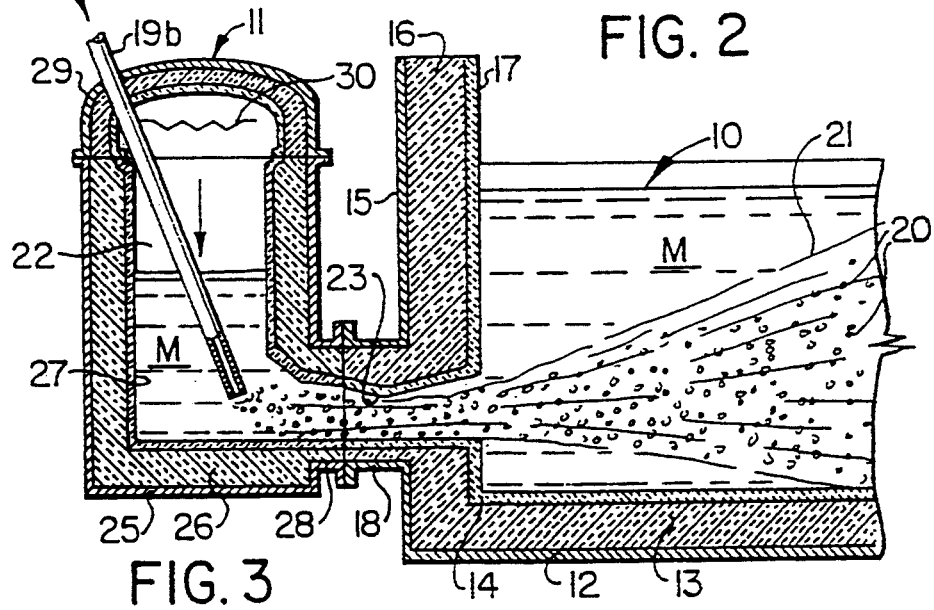
FIG. 3 is yet another embodiment of the injector system.

FIGS. 2 and 3 show two alternative positions of the gas inlet tube. In FIG. 2 a pair of inlet tubes 19a are injected directly into the throat of the orifice. Alternatively a porous refractory ring can be provided around the circumference of the orifice. While this arrangement works very efficiently in terms of creating the desired fine bubbles, it has been found to be a difficult area for installing the tubes or porous media and installations in this location are prone to servicing difficulties.

In another embodiment as shown in FIG. 3, the gas injection tube 19b may be inserted into the reservoir 22 such that the outlet becomes caught in the flow of metal entering the orifice. Once again, this is very efficient in shearing action and creating small bubbles, but it is less desirable from a practical point of view to insert the gas injection tube into the reservoir.

Figure 4:
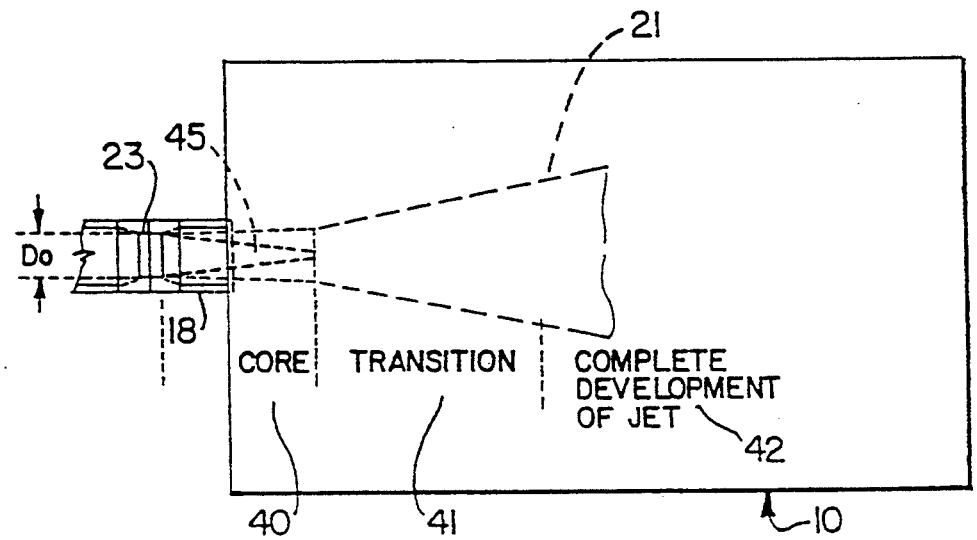
FIG. 4 is a schematic plan view showing jet development.

The formation of the metal jet can best be seen from FIG. 4 and it will be seen that the free jet expands over its trajectory in three regions. The first or core region 40 immediately following the orifice outlet is characterized by a low degree of broadening, around 5° and the maximum speed obtained in the orifice is conserved at the conical centre 45 of the jet in this core region 40 of the jet. The second region 41 of the jet is the transition zone and in this region the speed at the centre of the jet diminishes rapidly with distance from the orifice and the angle of broadening is about 3020 . In the final region 42, the angle of broadening diminishes further and the speed at the centre of the jet falls less rapidly.

Figure 5:
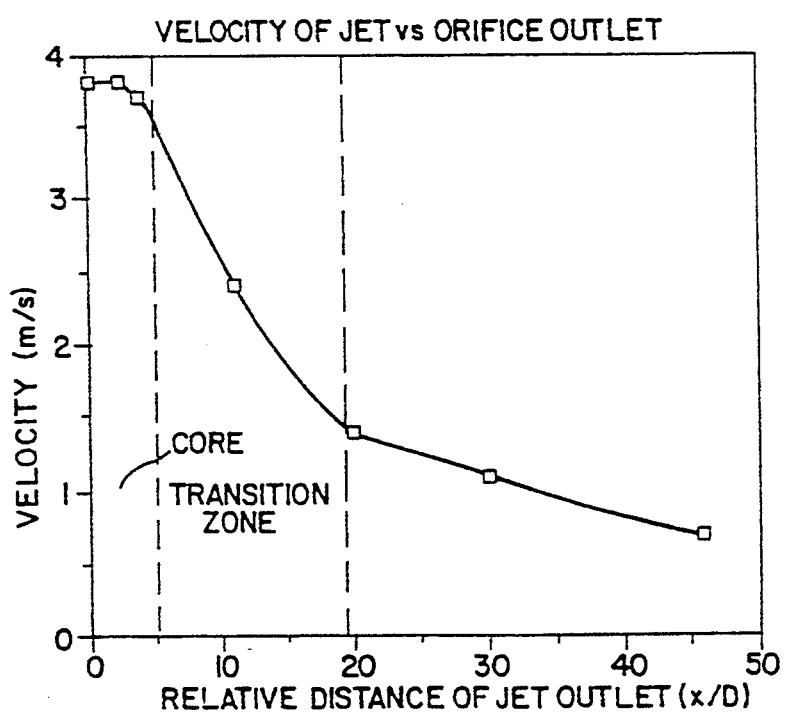
FIG. 5 is a plot of jet velocity as a function of distance from orifice as done by water modelling.

The speed profile at the centre 45 of the jet produced by the above system was measured using a physical model and the results obtained are shown in FIG. 5. Accordingly to this profile, the first or core region 40 has a length equivalent to approximately five times the diameter of the jet orifice ($5 \times D_o$) and the transition zone 41 continues up to a distance from the orifice equivalent to 20 times its diameter ($20 \times D_o$). Therefore, to take advantage of the maximum power for breaking up the gas into small bubbles when the gas injection tube 19 is within the furnace, it is essential that the gas be injected at a distance of no more than $5 \times D_o$ from the orifice outlet, i.e. directly into the plume of the jet and preferably into the conical portion 45 of maximum velocity.

Figure 6:
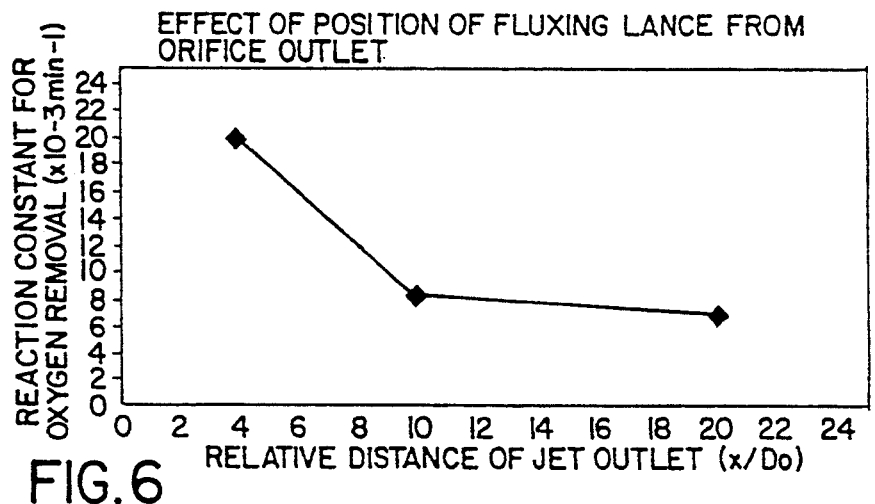
FIG. 6 is a plot of reaction constant as a function of distance from orifice as done by water modelling.

To measure the efficiency of the process using the physical model, measurements were made of the oxygenation of water using air as the reactive gas during the injection. The oxygenation of water corresponds to the form of a first order chemical reaction similar to the removal of alkalis from aluminum by chlorine. The graph of FIG. 6 shows the reaction constant as a function of the distance between the gas injection tube 19 and the orifice outlet of the pump. These results confirm that the nozzle should be positioned in the plume of the jet.

Figure 7:
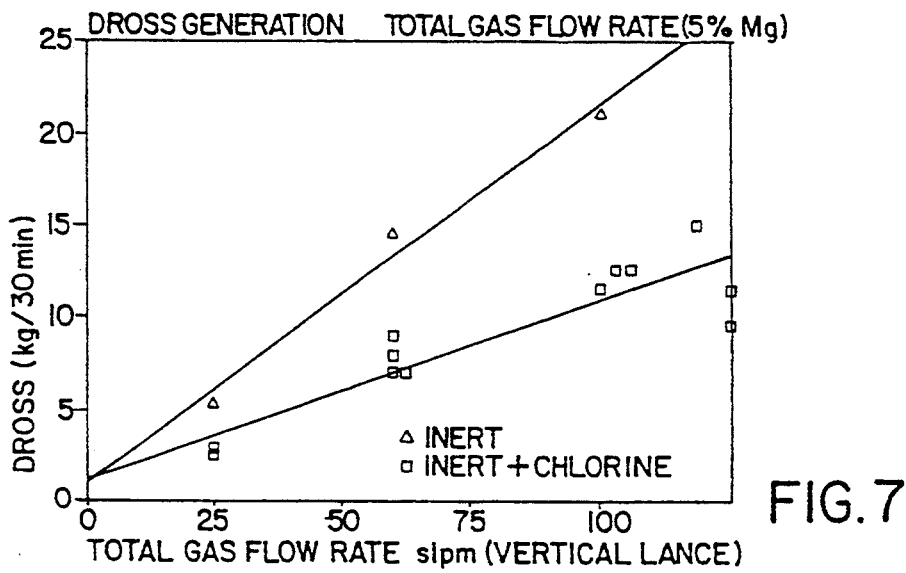
FIG. 7 is a plot of dross generation as a function of total gas flow rate.

In order to illustrate the relationship of the amount of gas used in fluxing to dross formation, a single gas injection lance was used for injecting gases into a molten metal furnace bath. The metal was an aluminum alloy containing 5% Mg and different flow rates of inert gas and a mixture of inert gas and chlorine were fed into the bath. The dross formation was measured and the results are plotted in FIG. 7.

Figure 8:
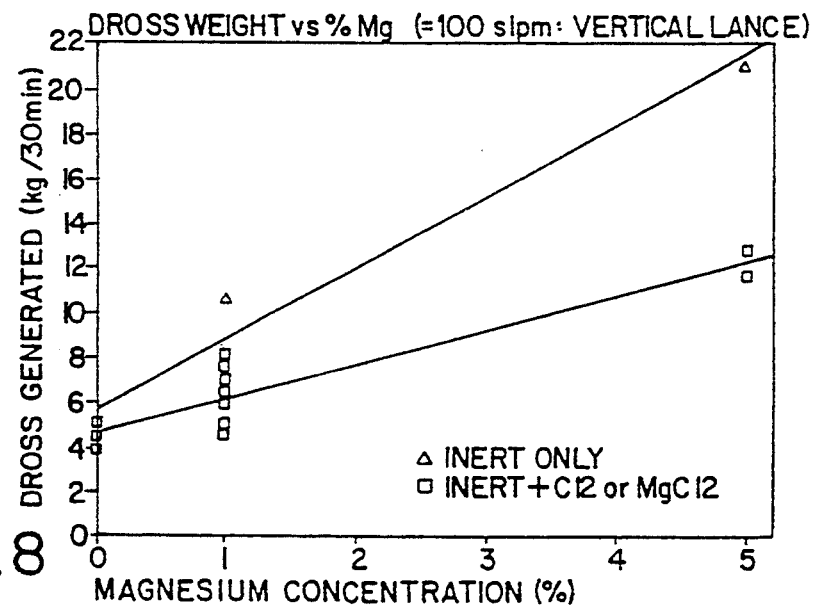
FIG. 8 is a plot of dross generation as a function of magnesium content.

The procedure was repeated using alloys of different magnesium concentrations between and 0 and 5% and the results obtained are shown in FIG. 8.

Figure 9:
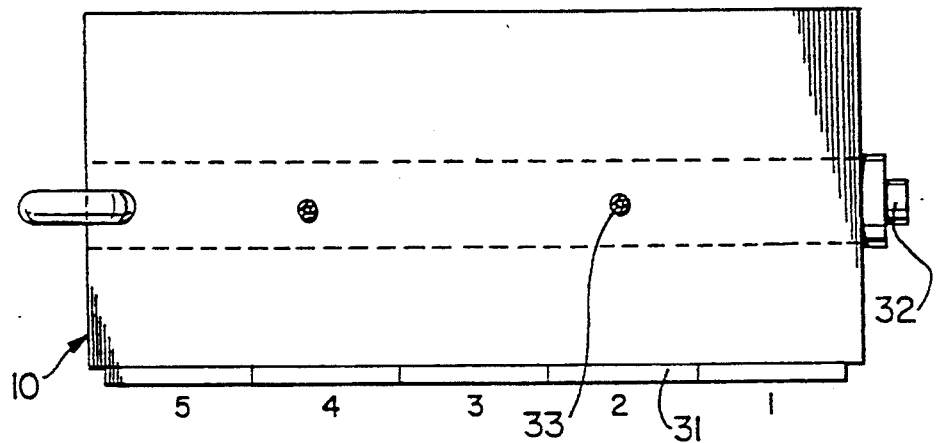
FIG. 9 is a schematic plan view of a prior art furnace.
Figure 10:
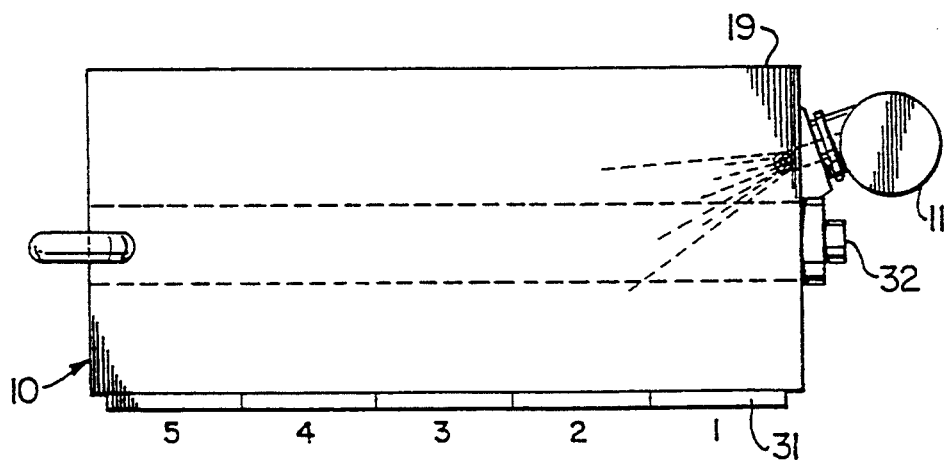
FIG. 10 is a schematic plan view of a furnace utilizing the present invention.

In order to illustrate the dramatic differences between gas injection according to this invention and traditional injection using static injection tubes, a 70 tonne rectangular furnace was utilized as shown in FIGS. 9 and 10. This furnace had side doors 31 and an end burner 32. For the static lance experiment, the lances 33 were positioned as shown in FIG. 9 and for the test according to this invention, the jet stirrer 11 was positioned with injection tube 19 as shown in FIG. 10.

The systems were operated for periods of up to 45 minutes with 600 liters per minute of gas being injected in the device of FIG. 9 and 300 liters per minutes of gas being injected in the device of FIG. 10. The gas composition was 20% of chlorine and 80% of nitrogen and in the standard fluxing system of FIG. 9 with a fluxing time of 45 minutes the quantity of chlorine used per tonne of metal treated was 0.25 kg.

With the fluxing technique of the present invention as shown in FIG. 10, one gas injection tube was positioned as shown and a gas flow rate of 300 liters per minute was used of the same gas composition. In this case, for a fluxing time of 45 minutes, the quantity of chlorine used was 0.12 kg/tonne of metal treated.

Another feature that can be seen from FIG. 10 is that the axis of the metal jet is preferably positioned at an angle to the longitudinal axis of the furnace chamber. This provides the most effective mixing within the furnace since the jet with entrained gas bubbles deflects at an angle of the walls of the furnace thereby circulating throughout the entire furnace. This further aids in the excellent contact between molten metal and gas that is achieved according to the present invention.

Figure 11A:
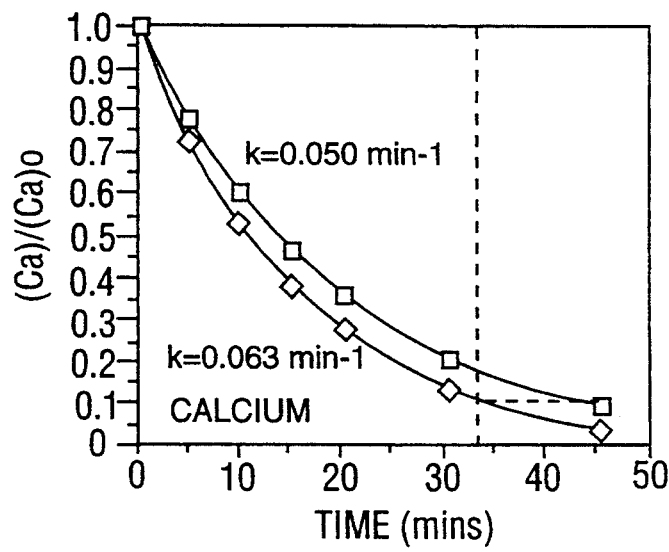
FIG. 11$a$, $b$, and $c$ are plots of alkali removals as a function of time.
Figure 11B:
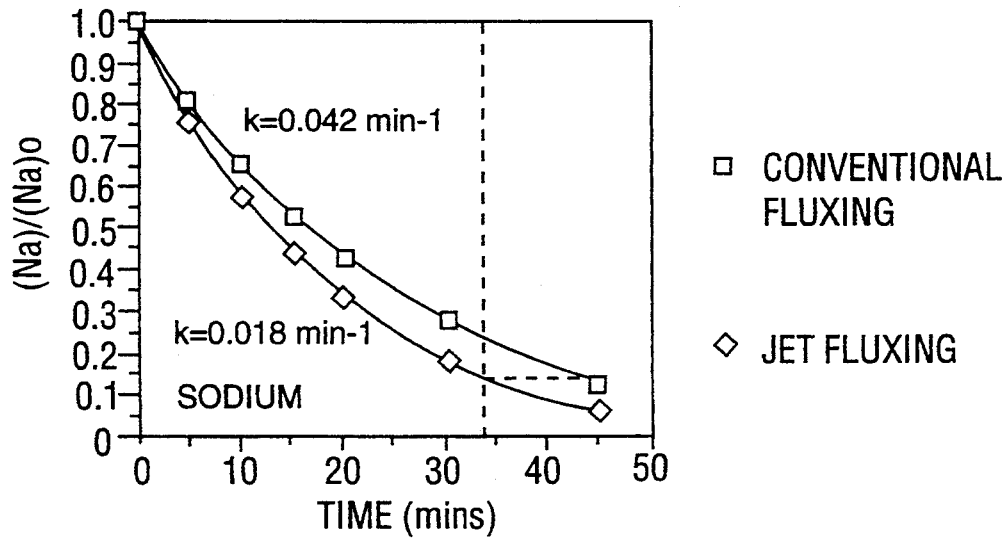
Figure 11C:
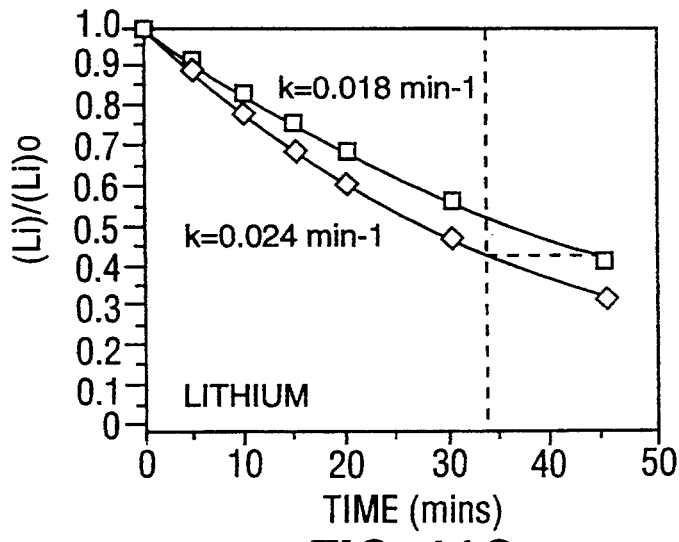

As can be seen from the results plotted in FIG. 11, the technique of the present invention increased the alkali removal by an order of 30% relative to the conventional fluxing. With increasing of the removal constant, the fluxing time can be reduced to 35 minutes (corresponding to 0.09 kg of chlorine/tonne of metal treated) and this achieved the same alkali level concentrations at the end as was achieved with 45 minutes of conventional fluxing. The chlorine consumption is thereby reduced by as much as 62% with the technique of the present invention, while the dross generated during fluxing is decreased by 40%.

Although the present invention has been described with a certain degree of particularity, it should be understood that various changes can be made to it by those skilled in the art without departing from the spirit or scope of the invention as described and hereinafter claimed.

We claim:

1. A device for injecting gas into molten metal in a furnace chamber comprising:
   (a) a stirring apparatus having a reservoir chamber separate from the furnace chamber, a connector portion with an orifice connecting the interior of the furnace and the reservoir for the passage of the molten metal between them through the connector portion, vacuum/pressure generating means connected to the reservoir chamber interior for alternatively and successively producing therein a vacuum for drawing molten metal into its interior from the furnace chamber and a positive pressure for expelling the molten metal therefrom into the furnace chamber through the orifice in the form of a high velocity stirring jet, and
   (b) gas injector tube adapted to inject gas into the high velocity stirring jet emerging from the orifice in an axial core region thereof of maximum velocity such that the gas is broken down into a large number of small bubbles which are circulated throughout the furnace chamber with the stirring jet.

2. A device according to claim 1 wherein the gas injector is a tube extending into the furnace adjacent the orifice-containing connector portion and positioned with the outlet of the tube within a cone of maximum velocity of a metal jet emerging from said orifice-containing connector portion.

3. A device according to claim 2 wherein the tube outlet is positioned downstream from the orifice a distance equivalent to no more than five times the diameter of the orifice.

4. A device according to claim 3 wherein the orifice has a diameter of about 5–10 cm.

5. A device according to claim 4 wherein the stirrer reservoir has a capacity of 500–1000 kg.

6. A process for treating molten metal with a treatment gas comprising the steps of:
   (a) providing a melt of a metal in a treatment device comprising a treatment vessel and a separate reservoir chamber flow connected to the treatment vessel by an orifice;
   (b) heating the melt in the treatment vessel to maintain a desired treatment temperature,
   (c) alternatively and successively producing in the reservoir chamber a vacuum for drawing molten metal into the reservoir from the treatment vessel and a positive pressure for expelling the molten metal therefrom through the orifice into the treatment vessel in the form of a high velocity jet and
   (d) injecting a treatment gas through a tube into the high velocity jet emerging from the orifice in an axial core region thereof of maximum velocity such that the gas is broken down into a large number of small bubbles which are circulated throughout the treatment vessel with the jet.

7. A process according to claim 6 wherein the metal is aluminum.

8. A process according to claim 7 wherein the treatment gas is an inert gas.

9. A process according to claim 8 wherein the treatment gas includes a reactive component.

10. A process according to claim 9 wherein the reactive component is a chlorine and/or fluorine containing material.

11. A process according to claim 10 wherein the reactive component is chlorine.

12. A process according to claim 10 wherein the reactive component is $SF_6$ or $SiF_4$.

13. A process according to claim 6 wherein the metal jet emerges from the orifice at a speed of at least 1 m/sec.

14. A process according to claim 13 wherein the speed is 5–10 m/sec.

15. A process according to claim 13 wherein the treatment gas is injected directly into the jet emerging from the orifice at a distance downstream from the orifice equivalent to five times the diameter of the orifice.

16. A process according to claim 13 wherein the treatment gas is injected directly into an axial cone of maximum velocity in the jet emerging from the orifice.

17. A process according to claim 6 wherein each suction cycle has a duration of about 10–15 seconds and each jet discharge cycle has a duration of about 10–15 seconds.

* * * * *